United States Patent [19]
Ikegaya et al.

[11] Patent Number: 4,660,795
[45] Date of Patent: Apr. 28, 1987

[54] SEAT SLIDE DEVICE FOR AUTOMOTIVE SEAT

[75] Inventors: Isao Ikegaya; Hatsuo Kawashima, both of Kosai, Japan

[73] Assignee: Fuji Kiko Company, Limited, Tokyo, Japan

[21] Appl. No.: 760,906

[22] Filed: Jul. 31, 1985

[51] Int. Cl.$^4$ .......................................... F16M 13/00
[52] U.S. Cl. .................. 248/430; 296/65 R; 384/47
[58] Field of Search ............... 248/430, 429, 424, 420; 297/341; 308/3 R, 3.6; 384/127; 296/65 R

[56] References Cited

U.S. PATENT DOCUMENTS

| | | | |
|---|---|---|---|
| 2,307,305 | 1/1943 | Saunders et al. | |
| 3,811,726 | 5/1974 | Muraishi et al. | 297/341 |
| 4,238,099 | 12/1980 | Hunwicks | 308/3.6 X |
| 4,291,856 | 9/1981 | Urai | 308/3 R X |
| 4,372,521 | 2/1983 | Rampel et al. | 248/430 |
| 4,378,101 | 3/1983 | Kazaoka et al. | 248/430 X |
| 4,520,982 | 6/1985 | Nishino | 248/430 |
| 4,533,107 | 8/1985 | Okazaki et al. | 248/430 |

FOREIGN PATENT DOCUMENTS 7421861 6/1974 Fed. Rep. of Germany.

OTHER PUBLICATIONS

Soviet Inventions Illustrated, Section Mechanical, Week K/12, 4th May 1983, Abstract No. D 9645 Q/4, Derwent Publications.

*Primary Examiner*—Ramon O. Ramirez
*Attorney, Agent, or Firm*—Bachman & LaPointe

[57] ABSTRACT

A seat slider device for an automotive seat is specially configured to minimize its height. An upper rail fixed to the bottom of the seat slidably engages a lower rail fixed to the floor. The rails have flanges along one edge which engage via a bearing. A plurality of regularly spaced holes are formed in the other edge of the lower rail. A lock lever mounted on the upper rail is manually actuable into and out of engagement with the holes in the lower rail, in which former case, the upper rail and the seat are held securely in place relative to the lower rail and the floor. Since the bearing and the locking holes are on opposite sides of the lower rail, they are free to lie in the same horizontal plane.

9 Claims, 11 Drawing Figures

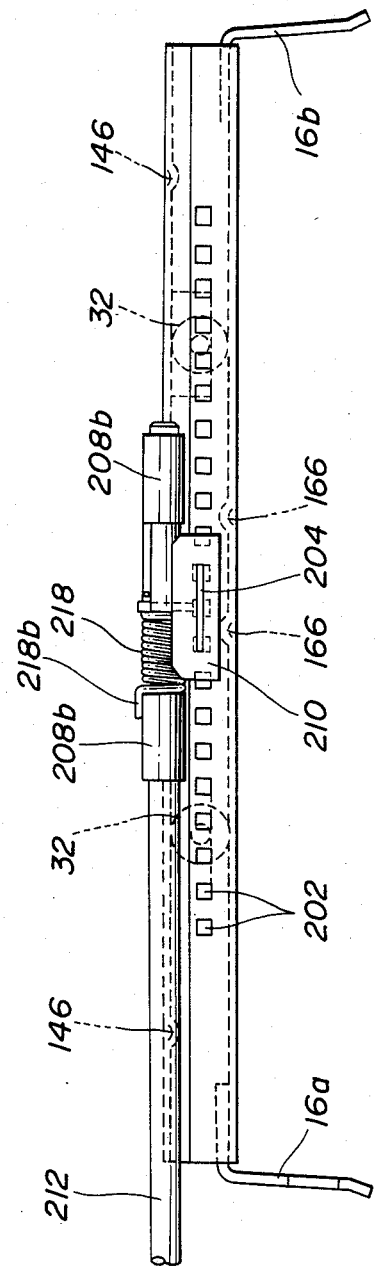
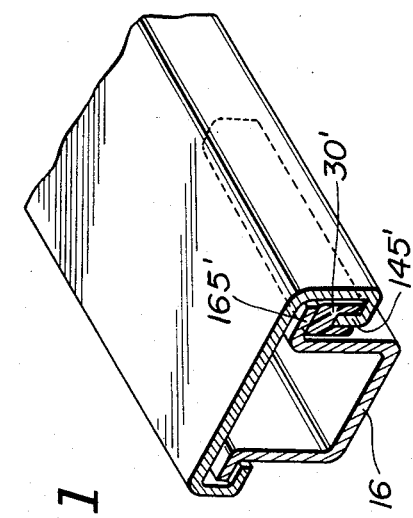

SEAT SLIDE DEVICE FOR AUTOMOTIVE SEAT

BACKGROUND OF THE INVENTION

The present invention relates generally to a seat slide device for an automotive seat allowing a vehicular seat ocupants to freely select a comfortable position. More specifically, the invention relates to a compact seat slide device which requires a smaller vertical clearance between the bottom of an automotive seat and the vehicular floor.

In general, a seat slide device comprises a lower rail fixed to the vehicle floor and an upper rail slidingly engaging the lower rail and fixed to the bottom of the vehicular seat. The lower rail has a pair of longitudinal flanges. The upper rail has essentially C-shaped or channel-shaped longitudinal edges. The edges of the upper rail engage the flanges of the lower rail for sliding engagement. Bearings received between the mating transverse edges and flanges allow smooth sliding movement of the upper rail with respect to the lower rail. In addition, the seat slide device also has a lock which secures the upper rail to the lower rail at the selected seat position. The lock releasably locks the upper rail to the lower rail.

The lock comprises generally a locking lever releasably engaging at least one of a plurality of locking holes formed in the lower rail and a bracket secured to the upper rail and supporting the locking lever. The locking holes are just large enough to receive a locking leg of the locking lever, which itself is sufficiently large to ensure a secure lock capable of withstanding shocks such as a vehicle collision.

Conventionally, the locking holes of the lower rail are located below the bearing. This imposes a height requirement on the lower rail, which, in turn, limits reduction of the height of the seat slide device overall. This also results in a relatively heavy seat slide device.

SUMMARY OF THE INVENTION

Therefore, it is an object of the invention to provide a smaller and lighter seat slide device than conventional seat slide devices.

In order to accomplish the aforementioned and other objects, a seat slide device, according to the present invention, has an asymmetrical configuration with bearings disposed along one longitudinal edge and a locking mechanism including locking hole formed along the other edge of the lower rail. Thus, since the lower edge of the locking holes and the lower end of bearings can lie in the same horizontal plane, the overall height of the lower rail can be reduced.

In addition, according to the preferred structure, the locking mechanism comprises a operation rod cooperating with a locking lever with a locking leg engageable to the locking holes, and a torsion spring biasing the operation rod in locking direction. This arrangement aids reduction of the size of the locking mechanism and thus aids reduction of the overall size and weight of the seat slide device. Furthermore, in accordance with the present invention, since relatively wider space can be provided in the vertical wall section of the lower rail for forming the locking holes, and the distance of the lower edge of the locking holes can be sufficient for providing enough strength for the bending section of the lower rail.

According to one aspect of the invention, a seat slide device for an automotive seat comprises a stationary rail fixed to a vehicle floor and having first and second horizontal flanges extending transversely from a major section of the rail, a sliding rail fixed to the vehicular seat for movement therewith and having third and fourth flanges extending transversely from a major section of the sliding rail, the third flange slidingly mating with the first flange and the fourth flange vertically opposing the second flange so as to define a first space therebetween, and the major section of the sliding rail and the stationary rail defining a second space therebetween, a bearing disposed within the first space, and a locking mechanism for locking the sliding rail to the stationary rail, the locking mechanism being disposed on the transverse side of the stationary rail opposite the side to which the bearing is arranged.

BRIEF DESCRIPTION OF THE DRAWINGS

The present invention will be understood more fully from the detailed description given herebelow and from the accompanying drawings of the preferred embodiment of the invention, which however, should not be taken to limit the invention to the specific embodiment, but are for explanation and understanding only.

In the drawings:

FIG. 10 is an elevation of the preferred embodiment of the seat slide device according to the present invention; and FIG. 11 is a perspective view of a section through a modified embodiment of the seat slide device.

DESCRIPTION OF THE PREFERRED EMBODIMENT

Figure 1:
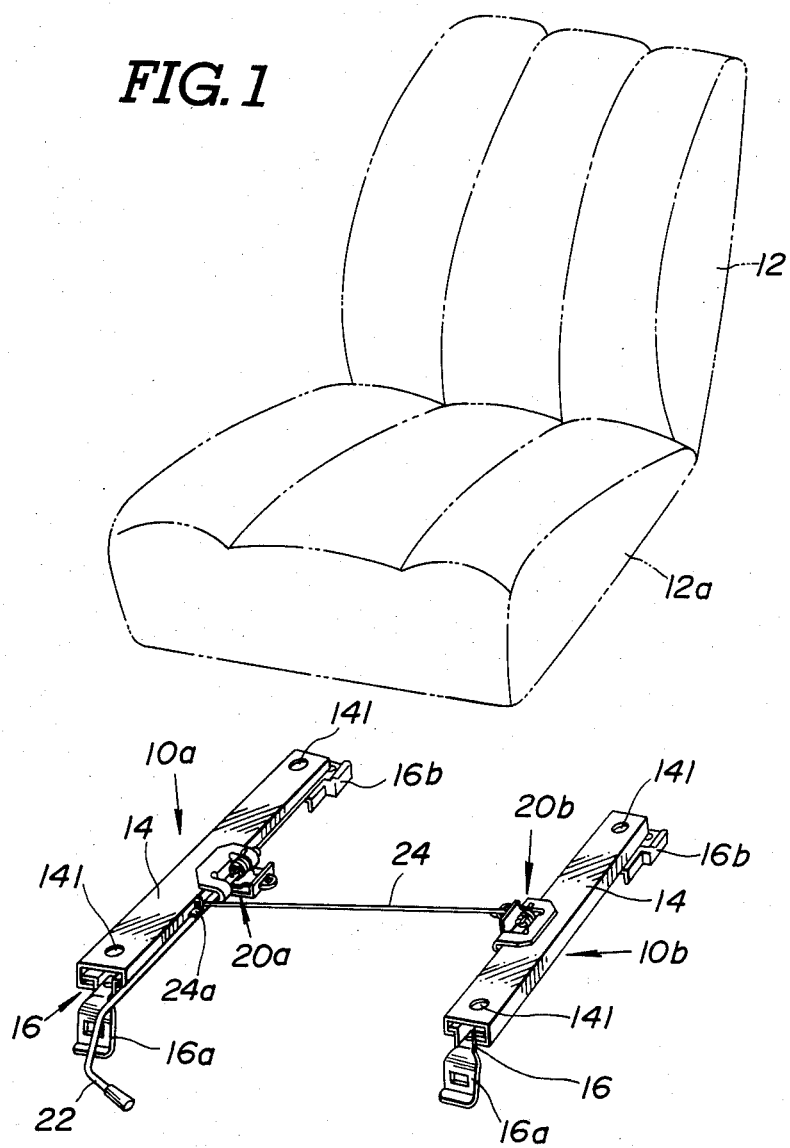
FIG. 1 is a fragmentary prespective view of a vehicular seat with seat slide devices released from the seat.

Referring now to the drawings, FIG. 1 shows a seat for an automotive vehicle with a pair of seat slide devices constructed according to the preferred embodiment of the present invention. The seat 12 is movable toward and away from the steering wheel and control pedals by means of the seat slide devices 10a and 10d so as to allow the vehicular seat ocupants to select a comfortable seat position. Each of the seat slide devices 10a and 10b generally comprises an upper rail 14 as a sliding rail movable with the seat, and a lower rail 16 as a stationary rail. The upper rail 14 is fixed to the bottom of a seat cushion frame (not shown) of a seat cushion 10a for movement therewith. The lower rail 16 has mounting brackets 16a and 16b at both longitudinal ends thereof. The lower rail 16 is firmly fixed to the vehicle floor (not shown) by means of the brackets 16a and 16b. The upper and lower rails 14 and 16 slidingly engage each other so that the upper rail slides along the lower rail 16 with the seat 10 for adjustment of the seat position.

The seat slide devices 10a and 10b are also provided with a locking mechanisms 20a and 20b for locking the upper rails 14 to the lower rail 16 so as to hold the seat 12 at the selected position. The locking mechanism 20a includes a manually operated handle 22 allowing manual lock-release for adjustment of the seat position. The locking mechanism 20b is connected for cooperation with the locking mechanism 20a by means of a linkage 24. Therefore, when the handle 22 is manually operated for lock-release, both of the locking mechanisms 20a and 20b are actuated to the released position.

Since the two seat slide devices 10a and 10b have essentially the same design, throughout the following discussion a single seat slide device will be referred to by the reference numeral "10". Also, in the disclosure, the locking mechanisms will be referred to in common by the reference numeral "20".

Figure 2:
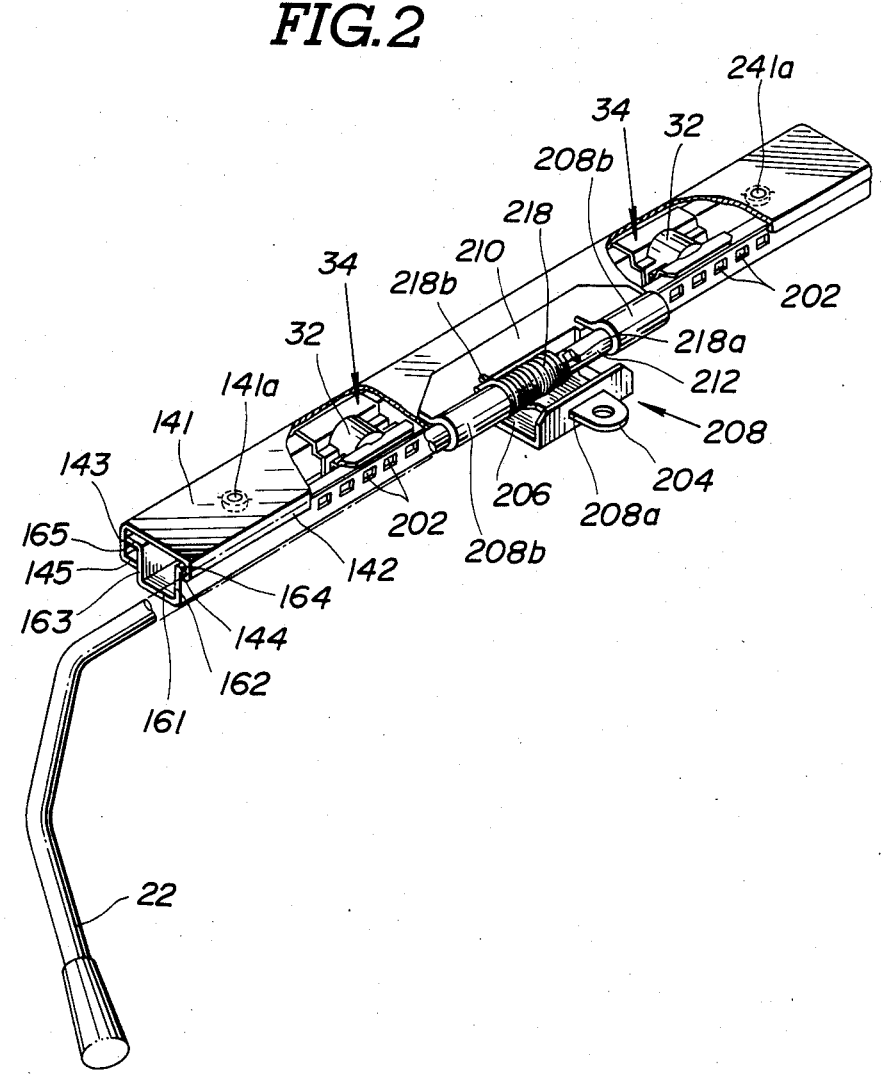
FIG. 2 is an enlarged cutaway view of the preferred embodiment of the seat slide device of FIG. 1.
Figure 3:
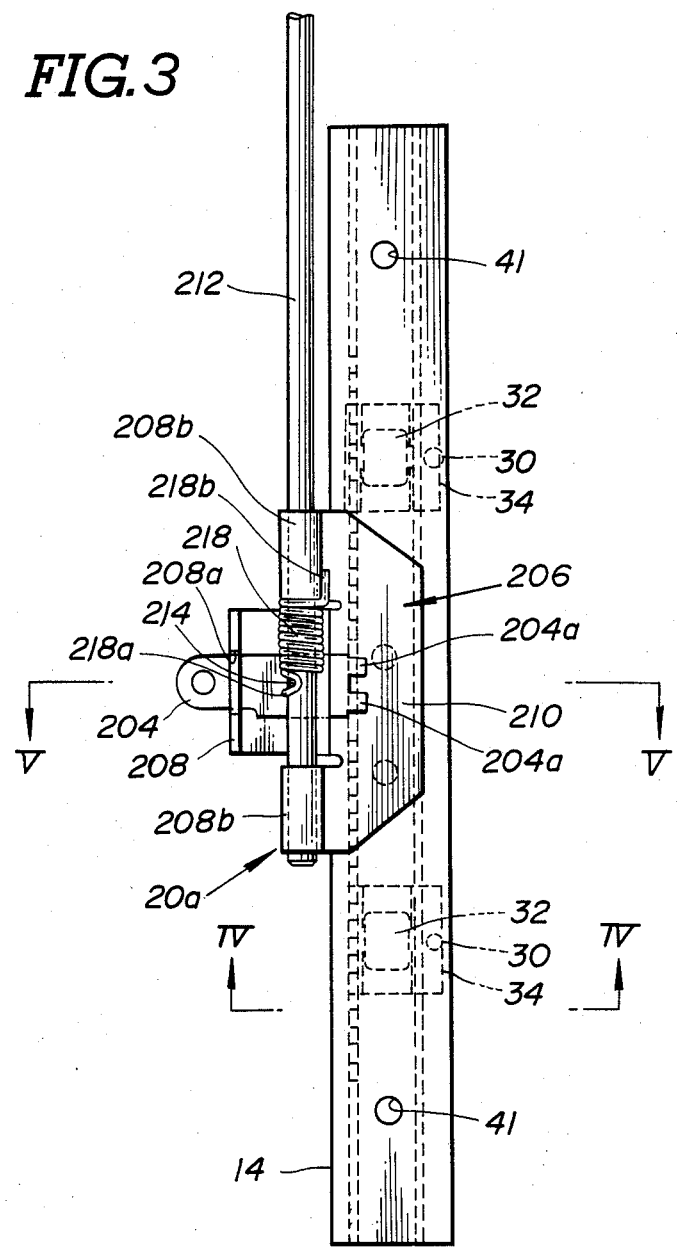
FIG. 3 is a plan view of the preferred embodiment of the seat slide device of FIG. 1.
Figure 4:
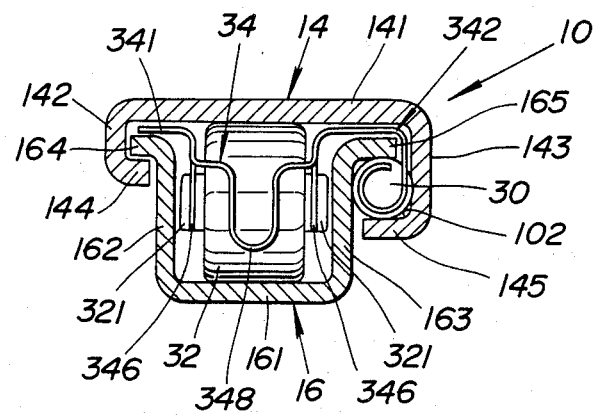
FIG. 4 is a further enlarged section taken along line IV—IV of FIG. 3.

As shown in FIGS. 2 to 4, the lower rail 16 has a horizontal section 161 lying on the vehicular floor, vertical walls 162 and 163 extending vertically from both longitudinal edges of the horizontal section 161 and flanges 164 and 165 extending outwards from the upper ends of the vertical walls. The flange 164 is shorter than the flange 165. Similarly, the upper rail 14 has a horizontal section 141 attached to the seat cushion frame by means of fastening bolts extending through openings 141a formed therethrough. The upper rail 14 also has vertical walls 142 and 143 extending downwards from both longitudinal edges of the horizontal section 141 and flanges 144 and 145 extending inwards from the lower edges of the vertical walls. The vertical wall 142 is shorter than the vertical wall 143, and the flange 144 is shorter than the flange 145.

The upper and lower rails 14 and 16 engage by opposition of the vertical walls 142, 162 and 143, 163 and the flanges 144, 164 and 145, 165. The flange 145 retains some vertically clearance relative to the corresponding flange 165 of the lower rail. The vertical wall 143 also has some transverse clearance relative to the corresponding vertical wall 163 of the lower rail. Therefore, a space 102 is delimitted by the flanges 145 and 165 and vertical walls 143 and 163. The space 102 accommodates bearings 30 which facilitate sliding movement of the upper rail 14 relative to the lower rail 16. Also, a hollow space 104 is defined between the horizontal sections 141 and 161 and the vertical walls 162 and 163. This space 104 accommodates sliding rollers 32.

Figure 5:
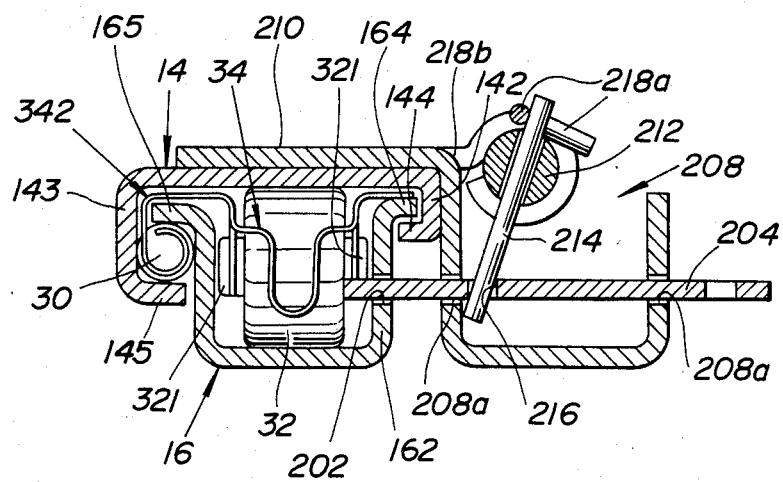
FIG. 5 is a enlarged section taken along line V—V of FIG. 3.

As best shown in FIGS. 2, 4 and 5, the sliding rollers 32 and the bearings 30 are located at corresponding longitudinal positions along the rails so that they can be retained in their respective spaces 104 and 102 by means of a common retainer 34.

A plurality of locking holes 202 of essentially rectangular configuration are formed in longitudinal alignment and at regular intervals along the vertical wall 162. A locking lever 204 is supported for movement therewith by means of a bracket 206 fixed to the upper rail 14. The locking lever 204 with bifurcated locking legs 204a can engage any two adjacent locking holes 202 so as to establish locking engagement between the two rails 14, 16.

As shown in FIGS. 2 and 5, the bracket 206 has a channel-shaped section 208. The locking lever 204 extends through openings 208a formed in the channel-shaped section 208. A mounting section 210 extends transversely from the upper end of one of the vertical wall of the channel-shaped section 208 and is firmly secured to the horizontal section 141 of the upper rail 14. From the upper end of the same vertical wall of the channel-shaped section 208, a pair of cylindrical brackets 208b extends outwards, i.e. in the direction opposite to the direction in which the mounting section extends. An operation rod 212 extends through the cylindrical brackets 208b so as to be free to pivot about its longitudinal axis. The operation rod 212 is formed integrally with the handle 22. A link lever 214 extends through a diametrical hole in the rod 212 and loosely engages an opening 216 through the locking lever 204. Loose engagement between the link lever 214 and the opening 216 of the locking lever 204 enables conversion of angular movement of the operation rod 212 into linear movement of the locking lever. A torsion spring 218 is wound around the operation rod 212 so as to bias the latter clockwise as viewed in FIG. 5. In order to apply the torsional spring force to the operation rod 212, one end 218a of the torsion spring 218 is connected to the operation rod 212 and the other end 218b of the torsion spring 218 is connected to the bracket 206.

Each of the rectangular bifurcated legs 204a of the locking lever 204 is approximately the same size and shape as the rectangular locking holes 202. The spacing between the legs 204 corresponds to the spacing between adjoining holes. Therefore, the legs 204a can engage any two adjacent holes 202 when the locking lever 204 is in its locking position.

It should be appreciated that, although the shown embodiment employs a locking lever with bifurcated legs, number of legs is not limited to two, but rather a locking lever with three or more legs can also be used. When three or more legs are used, the legs and holes can be smaller than in the shown embodiment and the spacing between holes and legs can be smaller. This would further shorten the minimum adjusting length of the seat for more precise seat position adjustment.

Figure 6:
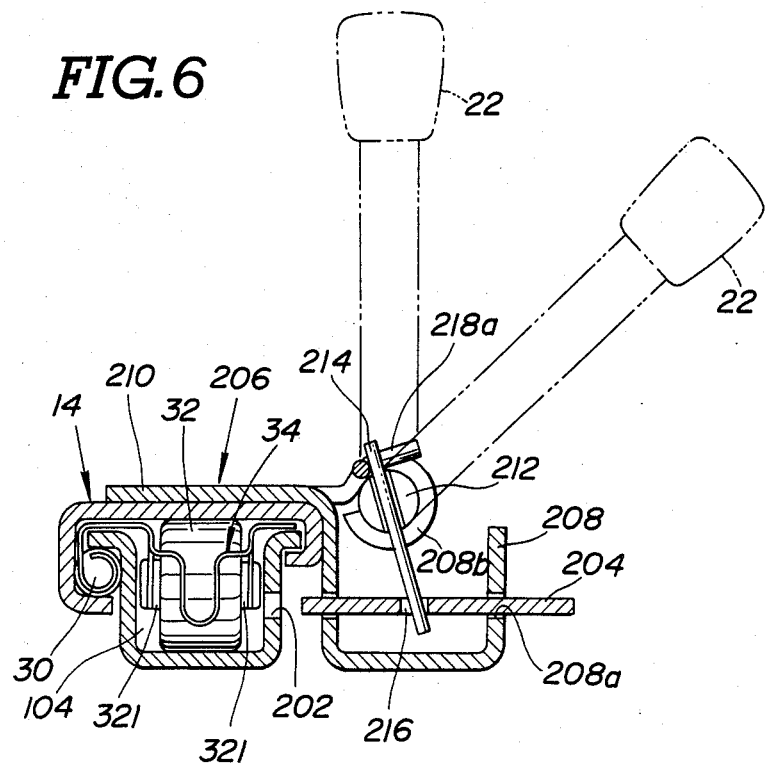
FIG. 6 is a view similar to FIG. 5 but showing the case where a locking mechanism is actuated to the lock-release state.

As viewed in FIG. 6, the handle 22 can be pivotally operated counterclockwise to release locking engagement between the locking lever 22 and the locking hole 202 so that the upper rail 14 can slidingly move along the lower rail 16. Specifically, such pivotal movement of the handle 22 causes the operation rod 212 to rotate counterclockwise in FIG. 6. This causes the link lever 214 to pivot counterclockwise. This results in disengagement of the locking lever 204 from the locking holes 202.

During this lock-release operation, the other seat slide device 10b in FIG. 1 is similarly actuated by the linkage 24 which extends from a projection 24a of the operation rod 212 to the locking lever 204 of the other seat slide device 10b. Therefore, the locking lever 204 of the other seat slide device 10b is pulled away from the corresponding locking hole of the other seat slide device. Therefore, no additional handle 22 is needed for the other seat slide device.

Although the shown embodiment employs a pair of seat slide devices, each of which is provided with a locking mechanism, it is not always necessary to provide separate locking mechanism for both of the seat slide devices.

Figure 9:
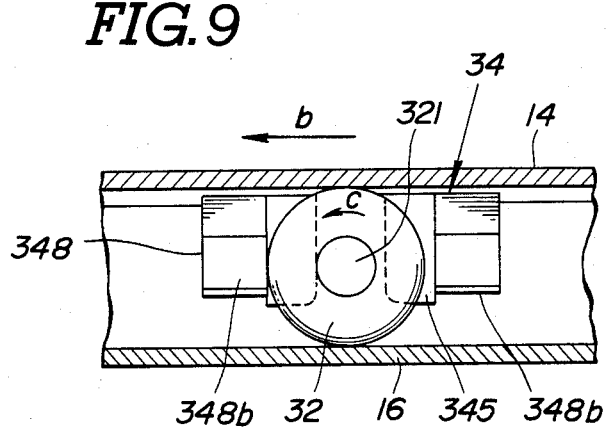
FIG. 9 is a section taken along line IX—IX of FIG. 4 with the roller itself left intact.
Figure 7:
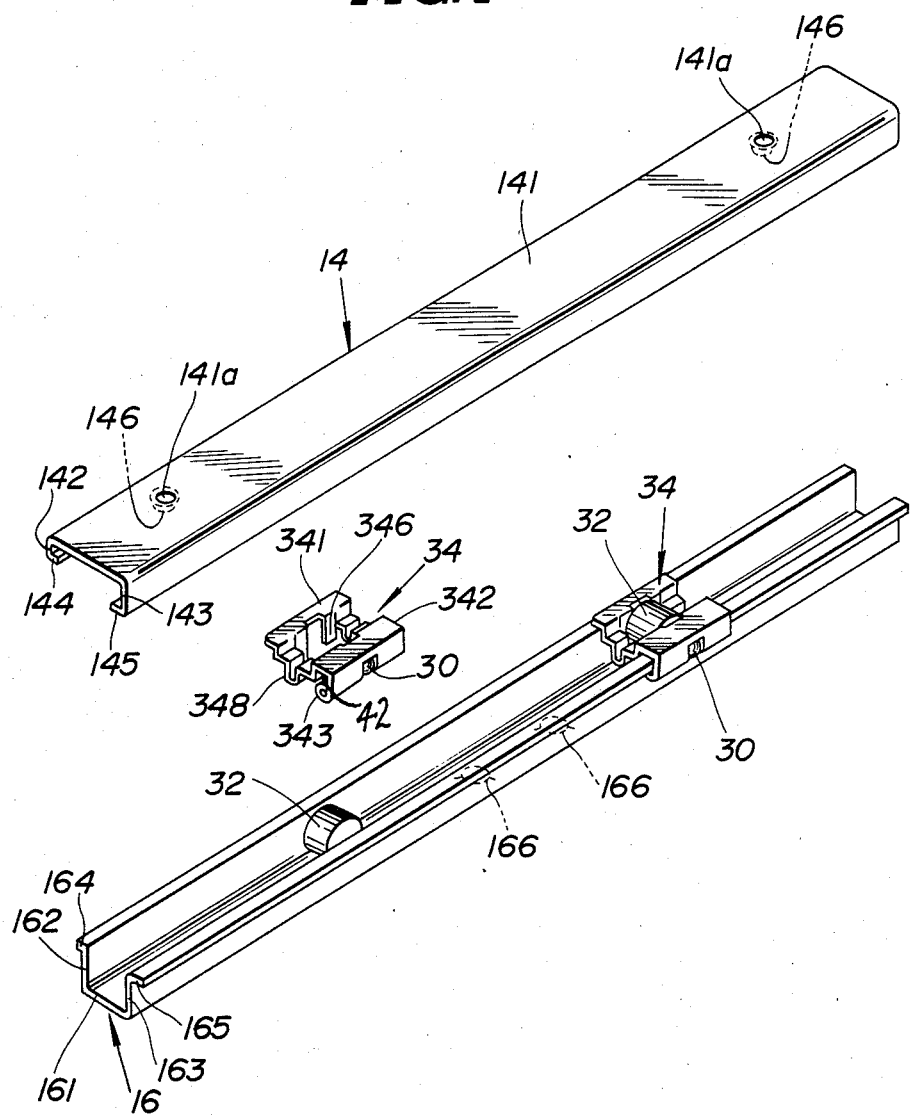
FIG. 7 is an exploded perspective view of the preferred embodiment of the seat slide device of FIG. 2, wherein the locking mechanism is removed for clarity.
Figure 8:
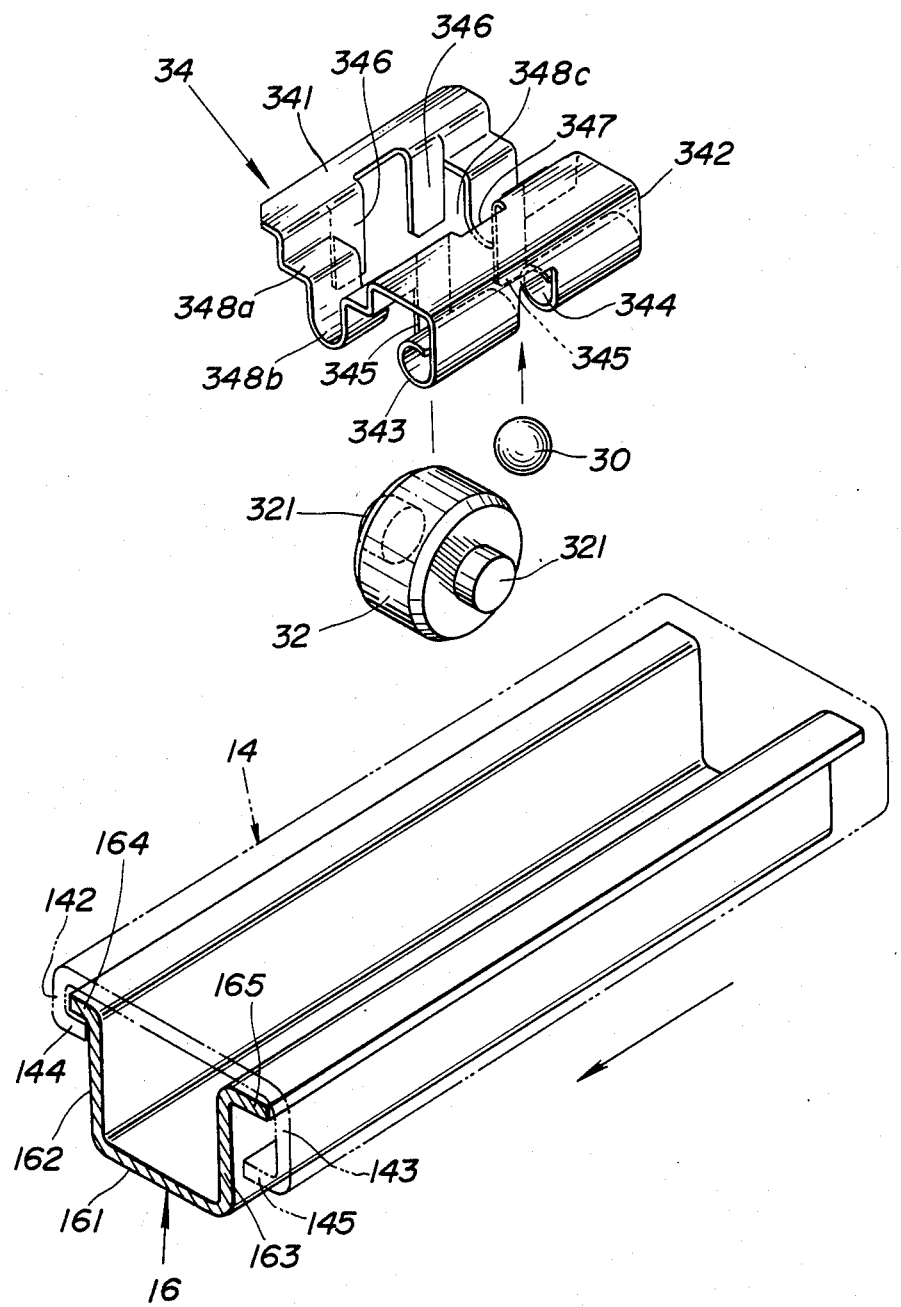
FIG. 8 is an enlarged exploded perspective view of a bearing assembly in the preferred embodiment of seat slide device according to the present invention.

FIGS. 7 to 9 show the bearing assembly for facilitating sliding movement of the upper rail relative to the lower rail in greater detail. The bearing assembly includes the aforementioned bearing 30, the sliding roller 32 and the retainer. As shown in FIG. 8, the retainer 34 is formed from a single piece of sheet metal. The retainer 34 slidably engages the lower rail 34. In order to achieve this, the retainer 34 is formed with a horizontally extending section 41 retained between the lower surface of the horizontal section 141 of the upper rail 14 and the flange 164 of the lower rail 16 when fully assembled. The retainer 34 is also provided with an essentially channel-shaped section 42 which engages the flange 165 of the lower rail 16. The section 42 has a rolled edge 343 having a diameter smaller than the diameter of the spherical bearing 30. The section 42 has a bearing-retaining cut-out 344 halfway along its length which serves to hold the bearing 30 in place.

The retainer 34 also has downward extending strips 345. Pairs of strips 345 extends from the inner edtes of both of the sections 341 and 342. Each pair of strips defines a space 346 accommodating a roller shaft 321 serving as the rotating axle of the sliding roller 32.

The retainer 34 has a roller opening 347 between the opposing pairs of strips 345 allowing the sliding roller 32 to come into contact with the rails 14, 16. A pair of bridging sections 348 connecting the longitudinal sections 341 and 342. The bridging section 348 is bent to have horizontal sections 348a on either side of a U-shaped section 348b. The rounded bottom of the U-shaped section 348b lies below the rotational axis of the roller shaft 321. The edges 348c of the bridging section 348 serve to restrict longitudinal movement of the roller 32 relative to the retainer 34.

As shown in FIG. 9, as the upper rail 14 moves in the direction denoted by the arrow b, the roller 32 rotates counterclockwise as indicated by arrow c. In this case, the roller 32 and the roller shaft 321 respectively contact with the leading bridging section 348 and strips 345 relative to the arrow b. As a result, the retainer is pushed in the direction b so as to move with the rail 14. On the other hand, the bridging section 348 and the strips 345 in contact with the roller 32 and roller shaft 321 restrict transverse the longitudinal displacement of the roller. This ensures stability of the profile of the roller for smooth sliding movement of the upper rail 14 relative to the lower rail.

The use of the roller shaft 321 reduces the width of the roller 32 and thus reduces the weight of the bearing assembly overall.

As shown in FIG. 10, the upper and lower rails 14 and 16 are both formed with embossed depressions 146 and 166 serving as stoppers for the bearing assembly. The depressions 146 are so positioned as to abut the leading bearing assembly to restrict sliding stroke of the upper rail. The depressions 166 cooperate with the depressions 146 to stop the upper rail at one extreme of travel, and to abut the trailing bearing assembly at the other extreme of travel of the upper rail.

The above seat slide device structure fulfills all of the objects and advantages sought for the present invention.

While the specific embodiment has been disclosed hereabove for the sake of the disclosure of the present invention, the invention should not be understood to be limited to the specific embodiment but rather includes all possible embodiments and modifications to the shown embodiment which do not depart from the principle of the invention set out in the appended claims.

For example, the bearing need not necessarily be spherical as set out above, but rather can be a slider block 30' made of a synthetic resin, as shown in FIG. 11. In this case, the slider block 30' would be firmly secured to the edge of the vertical flange 145'. The slider block 30' establishes sliding contact with the flange 165' of the lower rail 16' for sliding movement of the upper rail 14' relative to the lower rail. In this case, the retainer for holding the bearing becomes unnecessary. Therefore, the retainer may serve to hold only the roller.

What is claimed is:

1. A seat slide device for an automotive seat comprising:
   a stationary rail fixed to a vehicle floor and having first and second horizontal flanges extending transversely from a major section of the rail;
   a sliding rail fixed to the vehicular seat for movement therewith and having third and fourth flanges extending transversely from a major section of the sliding rail, said third flange slidingly mating with said first flange and said fourth flange vertically opposing said second flange so as to define a first space therebetween, and said major section of said sliding rail and said stationary rail defining a second space therebetween;
   a first bearing disposed within said first space; and
   a second bearing disposed within said second, space and a common retainer for holding both said first bearing and said second bearing;
   a locking mechanism for locking said sliding rail to said stationary rail, said locking mechanism being disposed on the transverse side of said stationary rail opposite the side to which said first bearing is arranged.

2. The seat slide device as set forth in claim 1, wherein said first bearing comprises a ball member, and said second bearing comprises a roller.

3. The seat slide device as set forth in claim 2, wherein said retainer comprises a first section slidingly mounted on said stationary rail for movement along the longitudinal axis of said stationary rail according to movement of said sliding rail, a second section disposed within said first space and holding said bearing to restrict longitudinal displacement of said bearing relative thereto, and a third section disposed within said second space and holding said roller to restrict longitudinal displacement of said roller relative thereto.

4. The seat slide device as set forth in claim 3, wherein said roller is provided with a transversely extending shaft and said third section includes pairs of strips on both transverse sides of said roller defining spaces receiving the ends of said shaft for restricting longitudinal displacement of said roller relative to said retainer.

5. The seat slide device as set forth in claim 3, wherein said third section comprises a pair of bent strips extending between said first and second sections and respectively located on opposite longitudinal sides of said roller, said strips presenting only thin edges for incident contact with said roller.

6. The seat slide device as set forth in claim 1, wherein said locking mechanism comprises a plurality of horizontally aligned locking holes in said stationary rail at given intervals, a locking lever with a plurality of locking legs spaced from each other at a distance corresponding to said given interval between locking holes, which locking lever is secured to said sliding rail by means of a mounting bracket, a biasing means coupled with said locking lever for normally biasing said locking lever toward engagement in the locking holes and a lock-release means associated with said locking lever and permitting manual actuation of said locking lever out of engagement with the locking holes against said biasing force exert by said biasing means.

7. The seat slide device as set forth in claim 6, wherein said biasing means comprises a longitudinally extending rod mounted on said mounting bracket, a torsion spring wound around said rod and having one end seated on said sliding rail and the other end seated on said rod, and an actuation lever attached to said rod and linked to said locking lever such that rotational force applied to said rod by said manual operation causes linear movement of said locking lever toward and away from the locking holes.

8. The seat slide device as set forth in claim 2, wherein at least one of said stationary and sliding rails is provided with a stopper means protruding into said second space for abutting and stopping said roller at desired limits of travel of said sliding rail.

9. The seat slide device as set forth in claim 8, wherein said stopper means comprises at least one pair of embossed projections disposed opposite said roller at the limits of travel of said sliding rail.

* * * * *